United States Patent [19]
Lukenich et al.

[11] Patent Number: 5,933,573
[45] Date of Patent: *Aug. 3, 1999

[54] METHOD OF CONTROLLING AN ELECTRIC MOTOR AND APPARATUS FOR CARRYING OUT THE METHOD

[75] Inventors: Stefan Lukenich, Singen; Thomas Von Der Heydt, St. Georgen; Hermann Rappenecker, Vohrenbach, all of Germany

[73] Assignee: Papst-Motoren GmbH & Co. KG, St. Georgen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/633,909

[22] Filed: Apr. 17, 1996

[30] Foreign Application Priority Data

Apr. 22, 1995 [DE] Germany ........................ 295 06 843 U
Apr. 22, 1995 [DE] Germany ........................ 295 06 842 U

[51] Int. Cl.⁶ ................................................. H02P 07/00
[52] U.S. Cl. ..................... 388/811; 388/819; 318/811; 318/369; 363/41
[58] Field of Search ................................. 318/799, 798, 318/805, 806, 807, 810, 811, 599, 254, 138, 364, 367, 369, 368; 363/41, 98; 388/811, 819, 804

[56] References Cited

U.S. PATENT DOCUMENTS

| | | | |
|---|---|---|---|
| 4,622,500 | 11/1986 | Budelman, Jr. ...................... | 318/599 |
| 4,638,223 | 1/1987 | Tajima ............................... | 318/254 |
| 4,803,410 | 2/1989 | Shinohara ........................... | 318/331 |
| 4,843,297 | 6/1989 | Landino et al. ..................... | 318/811 |
| 5,039,924 | 8/1991 | Avitan ............................... | 318/139 |
| 5,327,064 | 7/1994 | Arakawa ............................. | 318/801 |
| 5,377,791 | 1/1995 | Kawashima et al. .................. | 318/254 |
| 5,534,763 | 7/1996 | Williams et al. ..................... | 318/806 |
| 5,578,911 | 11/1996 | Carter et al. ........................ | 318/254 |

FOREIGN PATENT DOCUMENTS

| | | |
|---|---|---|
| 0 425 479 A2 | 5/1991 | European Pat. Off. . |
| 0 444 672 A1 | 9/1991 | European Pat. Off. . |
| 0 456 345 A1 | 11/1991 | European Pat. Off. . |
| 0 492 070 A1 | 7/1992 | European Pat. Off. . |
| 0 501 036 A1 | 9/1992 | European Pat. Off. . |

(List continued on next page.)

OTHER PUBLICATIONS

WPI Derwent Abstract of DE 36 03 924A, SHINOHARA +/HITACHI, published Sep. 10, 1987.
WPI Derwent Abstract of EP 0 492 070–A1, SCHUCKERT +OESTMANN, published Jul. 1, 1992.
Dr. E. Seefried et al, "Wechselrichter zur Speisung von Asynchronmotoren auf der Basis von Leistungstransistoren", [Inverter for Power Supply to Asynchronous Motors based on Power Transistors], in *ELEKTRIE,*, vol. 36, No. 5, pp. 231–235 (1982).

(List continued on next page.)

*Primary Examiner*—John W. Cabeca
*Attorney, Agent, or Firm*—Milton Oliver; Ware, Fressola, Van der Sluys & Adolphson LLP

[57] ABSTRACT

An electric motor (12) is supplied with current ($i_{mot}$) via a semiconductor switch (14). During operation, the semiconductor switch (14) is driven by a Pulse Width Modulation (PWM) unit 15 using a pulse-formed signal (32). For regulation of the duty ratio of this pulse-formed signal, a first analog signal, which is a function of at least a first motor parameter, is fed to the PWM unit. Further, a second analog signal (STBGR), which is a function of at least a second motor parameter, is fed to the PWM unit for regulation of the duty ratio. As long as the second motor parameter does not exceed a predetermined value, the duty ratio is predominantly controlled by the value of the first analog signal. When the second motor parameter exceeds the predetermined value, the duty ratio is at least predominantly controlled by the value of the second motor parameter, in order to control this second motor parameter through the PWM unit.

28 Claims, 10 Drawing Sheets

FOREIGN PATENT DOCUMENTS

| | | |
|---|---|---|
| 26 22 656 A1 | 12/1977 | Germany . |
| 42 47 036 C2 | 4/1979 | Germany . |
| 32 26 547 C2 | 2/1983 | Germany . |
| 32 21 093 A1 | 12/1983 | Germany . |
| 32 31 388 A1 | 3/1984 | Germany . |
| 36 03 294 | 9/1987 | Germany . |
| 42 28 973 A1 | 2/1995 | Germany . |
| 43 27 483 A1 | 2/1995 | Germany . |
| 295 00 014 U1 | 4/1995 | Germany . |
| 2 167 252 A1 | 5/1986 | United Kingdom . |

OTHER PUBLICATIONS

SGS–Thomson Microelectronics, "High–Power, Dual–Bridge IC's Ease Stepper–Motor–Drive Design", *in Motion Control Application Manual*, pp. 61–67, Grasbrunn, Germany, JAN. 1987, reprinted from Cahners Publishing Co.'s *EDN* magazine of Nov. 24, 1983 (Boston, MA).

Edwin Böhmer, *Elemente der angewandten Elektronik*, [Elements of Applied Electronics], 6th Edition, pp. 190–191, published by Vieweg subsidiary of Bertelsmann Group, Braunschweig, Germany (1989).

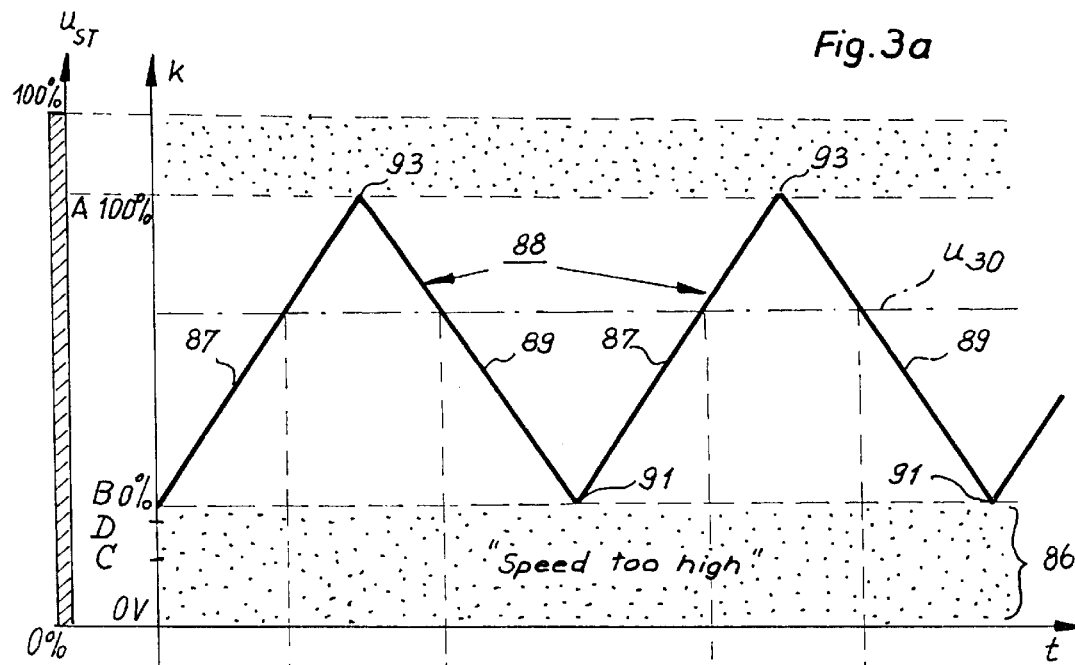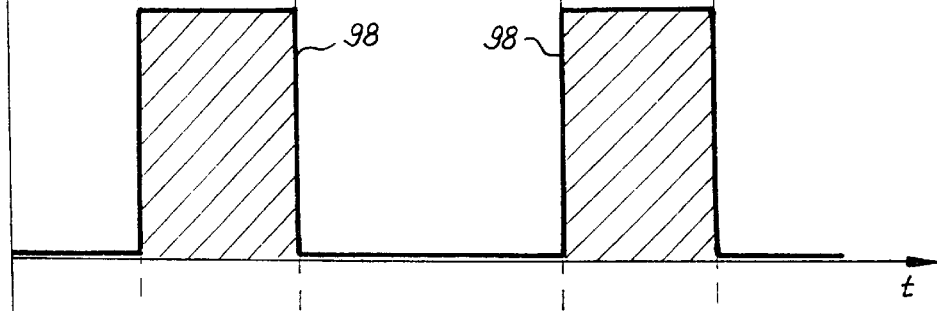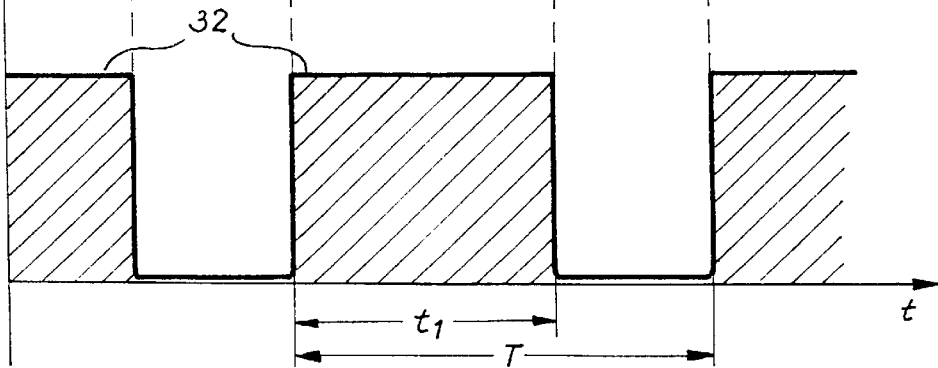
Fig. 3  $k = \frac{t_1}{T} \cdot 100\%$

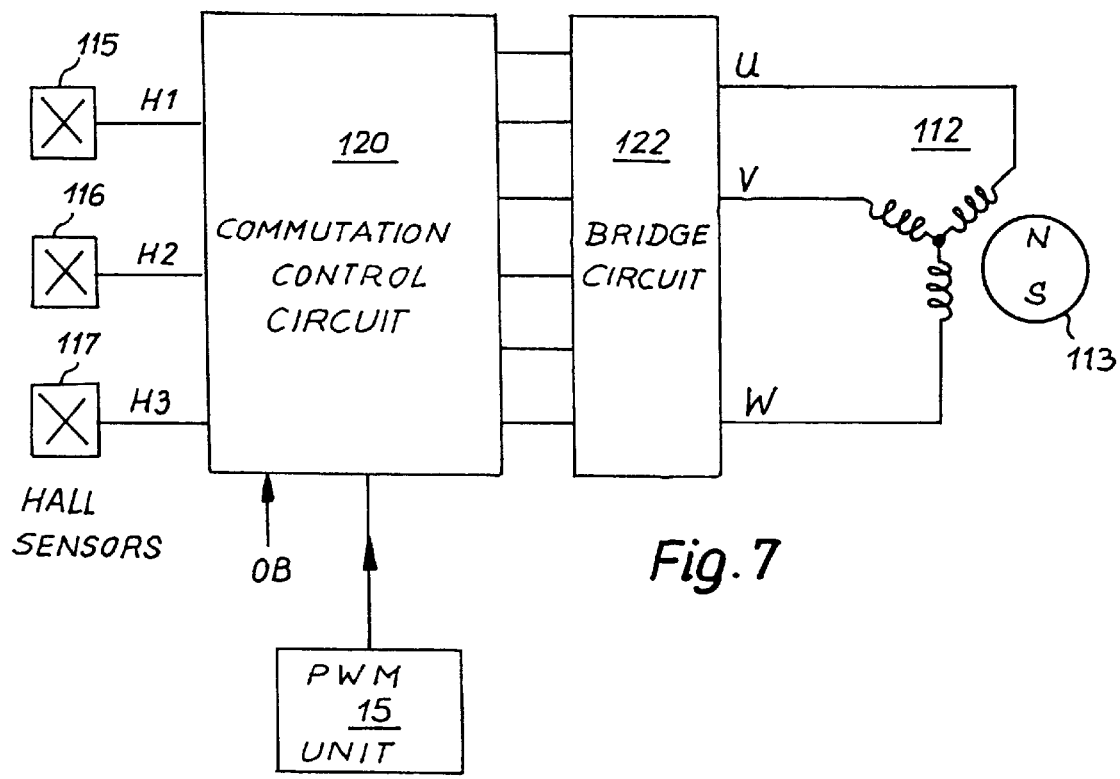
Fig. 7
$B_1 = \overline{H1} \cdot H2$
$T_1 = H1 \cdot \overline{H2}$
$B_2 = \overline{H2} \cdot H3$
$T_2 = H2 \cdot \overline{H3}$
$B_3 = H1 \cdot \overline{H3}$
$T_3 = \overline{H1} \cdot H3$
Fig. 8A
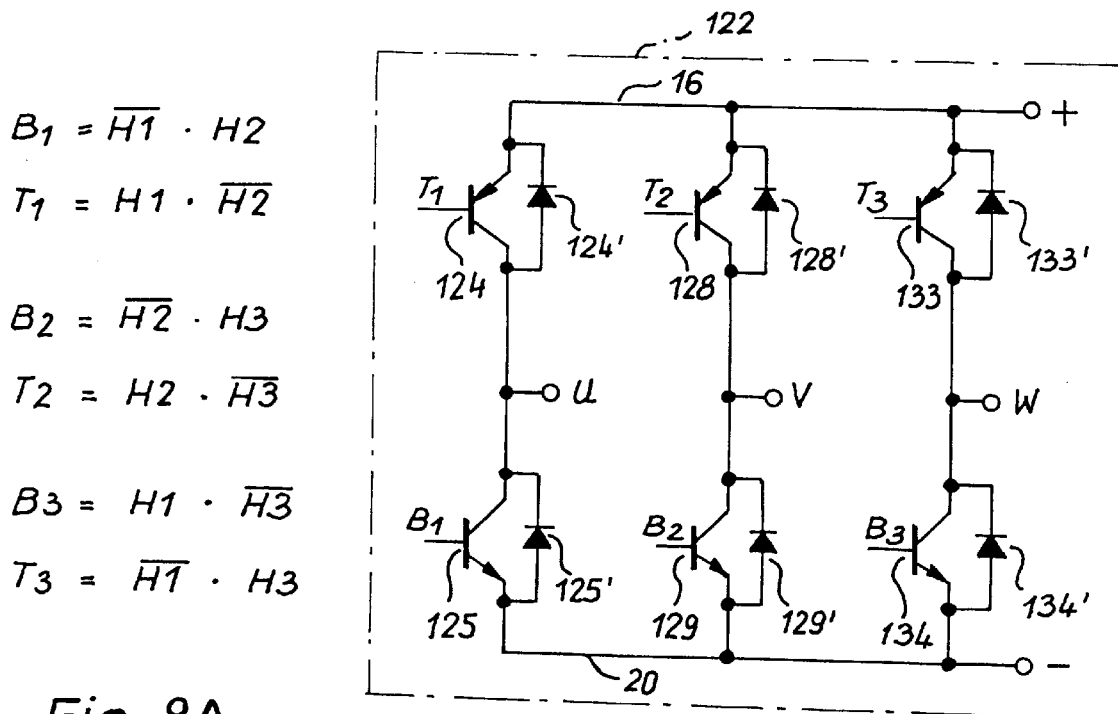
Fig. 8B

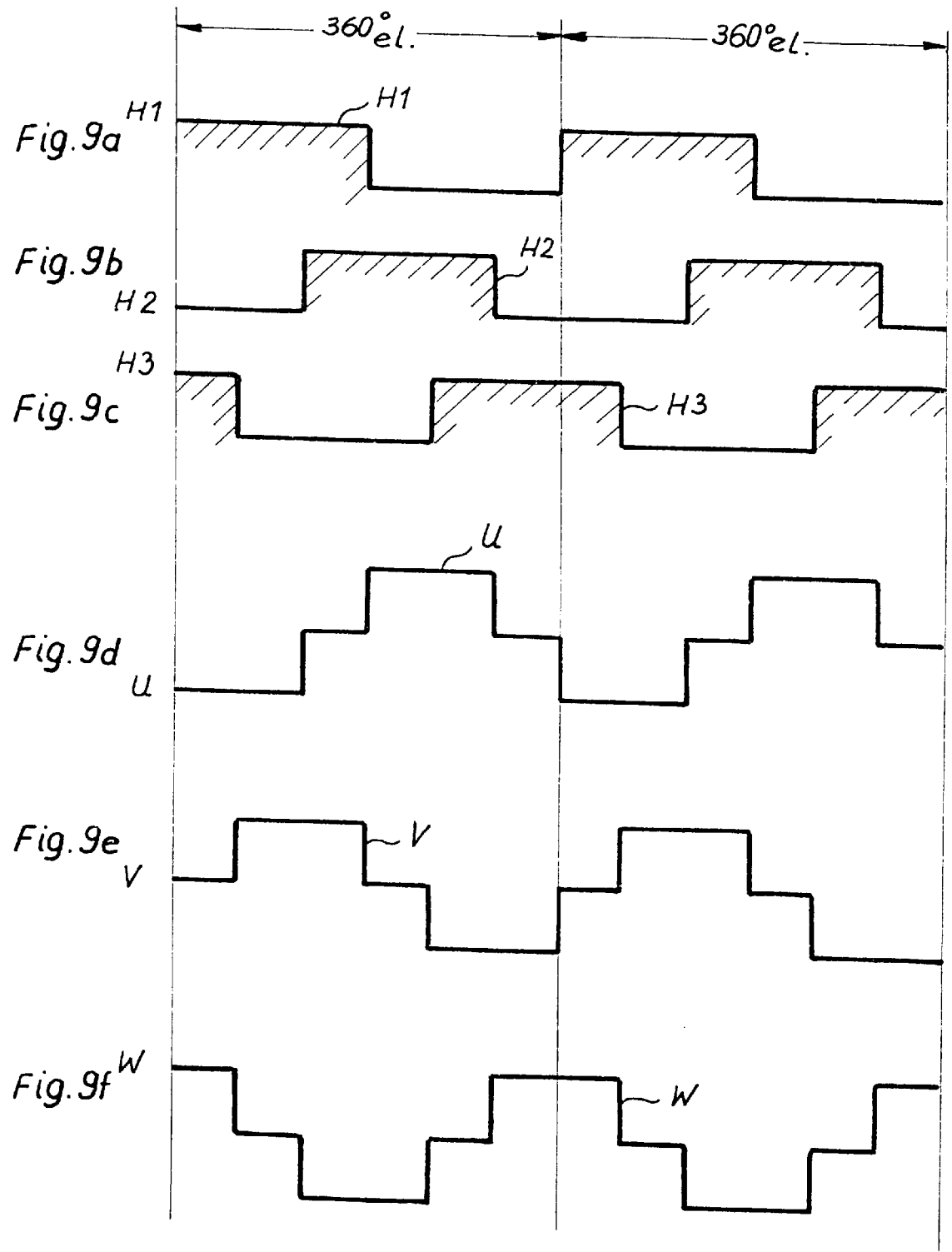

5,933,573

METHOD OF CONTROLLING AN ELECTRIC MOTOR AND APPARATUS FOR CARRYING OUT THE METHOD

Cross-reference to related application, disclosure of which is hereby incorporated by reference: U.S. Ser. No. 08/305,145, KARWATH, filed Sep. 13, 1994, now U.S. Pat. No. 5,537,015.

FIELD OF THE INVENTION

The present invention relates generally to methods and apparatus for controlling electric motors and, more particularly, to the use of pulse width modulation for this purpose.

BACKGROUND

With such motors, the problem is often posed, of how to economically control or regulate RPM (revolutions per minute) while simultaneously considering other motor parameters, such as the motor current, which should not be allowed to go too high. Similarly, in a braking mode, the voltage generated by the motor should not exceed a predetermined value, and the braking current during a braking process should not be allowed to go too high.

SUMMARY OF THE INVENTION

Accordingly, it is an object of the present invention to provide a new method of controlling or regulating such a motor, and a new circuit supplying current to a motor via at least one semiconductor switch.

Briefly, this is achieved, in accordance with the invention, by supplying the electric motor with current via at least one semiconductor switch which, during operation, receives a pulsed signal from a Pulse Width Modulator (PWM) according to the following steps:

for purposes of controlling the duty ratio of the pulsed signal, a first analog signal, which is a function of at least a first motor parameter, is fed to the PWM;

for purposes of controlling the duty ratio of the pulsed signal, a second analog signal, which is a function of at least a second motor parameter, is fed to the PWM;

as long as the second motor parameter does not exceed a predetermined value, the duty ratio is determined at least predominantly by the magnitude of the first analog signal;

whenever the second motor parameter does exceed the predetermined value, the duty ratio is then determined at least predominantly by the magnitude of the second analog signal, in order to influence this second motor parameter by use of the PWM. One thus achieves the result that the motor current is controlled or regulated according to that motor parameter which has the instantaneous highest priority.

BRIEF FIGURE DESCRIPTION

Further details and advantageous refinements of the invention can be gleaned from the following description and the accompanying drawings of preferred embodiments, which are intended as exemplary only, and not as limitations of the invention.

FIG. 3 is a set of voltage waveform graphs a, b, and c, drawn to a common time scale, which explain operation of the apparatus of FIG. 1;

FIG. 7 is a block circuit diagram of an electronically commutated motor;

FIG. 8A is a table of logic equations;

FIG. 8B illustrates a bridge circuit for the motor of FIG. 7, which is controlled according to the table in FIG. 8A;

FIG. 9 is a set of graphs, drawn to a common time scale, showing the Hall sensor signals H1, H2, H3 of the motor of FIG. 7, and the associated motor winding strand currents U, V, and W;

DETAILED DESCRIPTION

Figure 1:
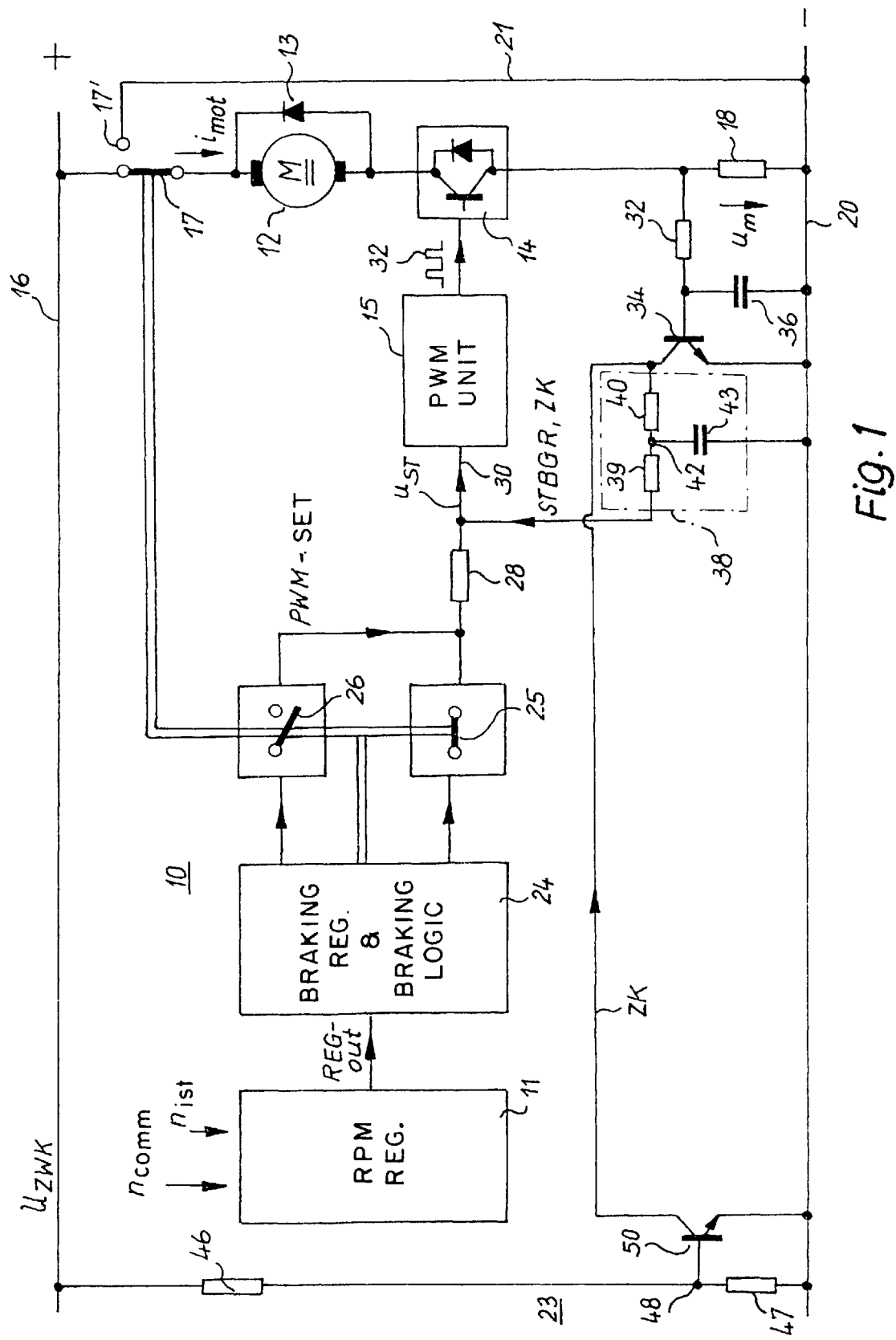
FIG. 1 is a block circuit diagram of a first embodiment of the motor circuit of the present invention.

FIG. 1 shows a circuit 10 according to the invention, which serves to control the RPM of a DC motor 12, and to limit the pulse-formed motor current $i_{mot}$ to a predetermined maximum value. Further, this circuit serves, whenever motor 12 exceeds a target or command value $n_{comm}$ of RPM set by a rotational speed regulator 11, to switch motor 12 over to a braking operational mode, until the RPM is so far reduced that approximately the desired RPM value has been reached. A free-running diode is connected antiparallel to the motor, i.e. in parallel but with an opposite conductive direction, as shown in FIG. 1.

In series with motor 12, there is arranged a controllable semiconductor switch 14, which is controlled by a Pulse Width Modulation (PWM) controller 15 having a special structure which is explained below, with reference to FIGS. 2 & 3. In series with semiconductor switch 14, there is provided a measuring resistor 18, across which arises, during operation, a measured voltage $u_m$ which is employed for current limitation purposes.

Motor 12 is connected via a selector switch 17, in the manner shown, to a positive conductor 16, and, from this positive conductor, the current path goes via the selector switch 17 through the motor 12, then to semiconductor switch 14, to measuring resistor 18, and thence to a negative conductor 20. If the selector switch 17 is thrown to its alternate position 17', it thereby forms a short-circuit connection 21 for motor 12, through which this motor is braked. The height or magnitude of the braking current is determined by the fact that semiconductor switch 14 is turned OFF and ON by PWM controller 15 with a corresponding duty ratio. In this connection, the braking current is measured at the measuring resistor 18, and the current limitation process prevents the flow of a too-high braking current. This is particularly important if motor 12 has a permanent-magnet rotor, since a too-high braking current could lead to a partial or complete demagnetization of the rotor magnet. A partial demagnetization means a weakening of the rotor magnet.

Figure 4:
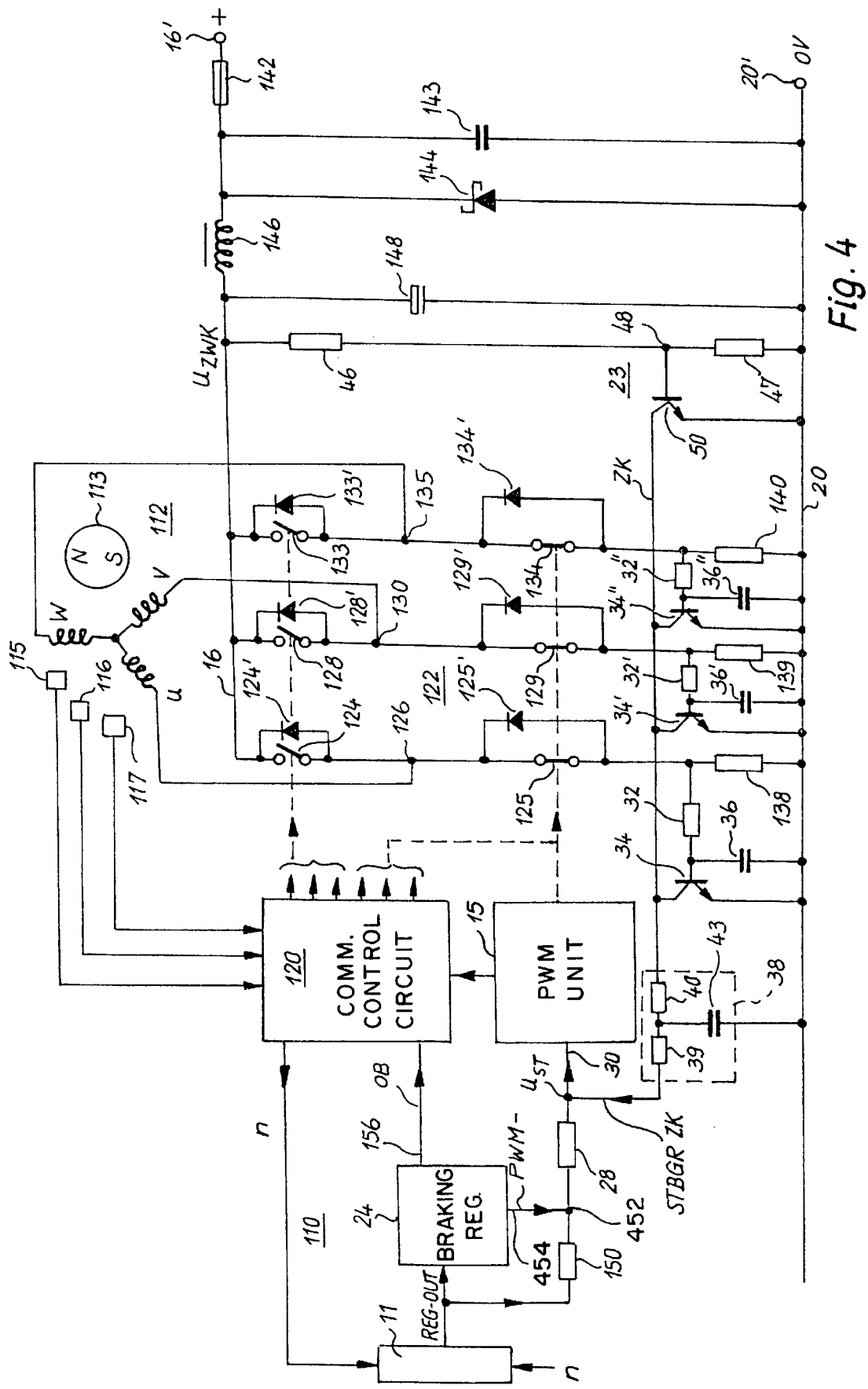
FIG. 4 illustrates a second embodiment of the invention, which shows use of the invention with an electronically commutated motor.
Figure 5:
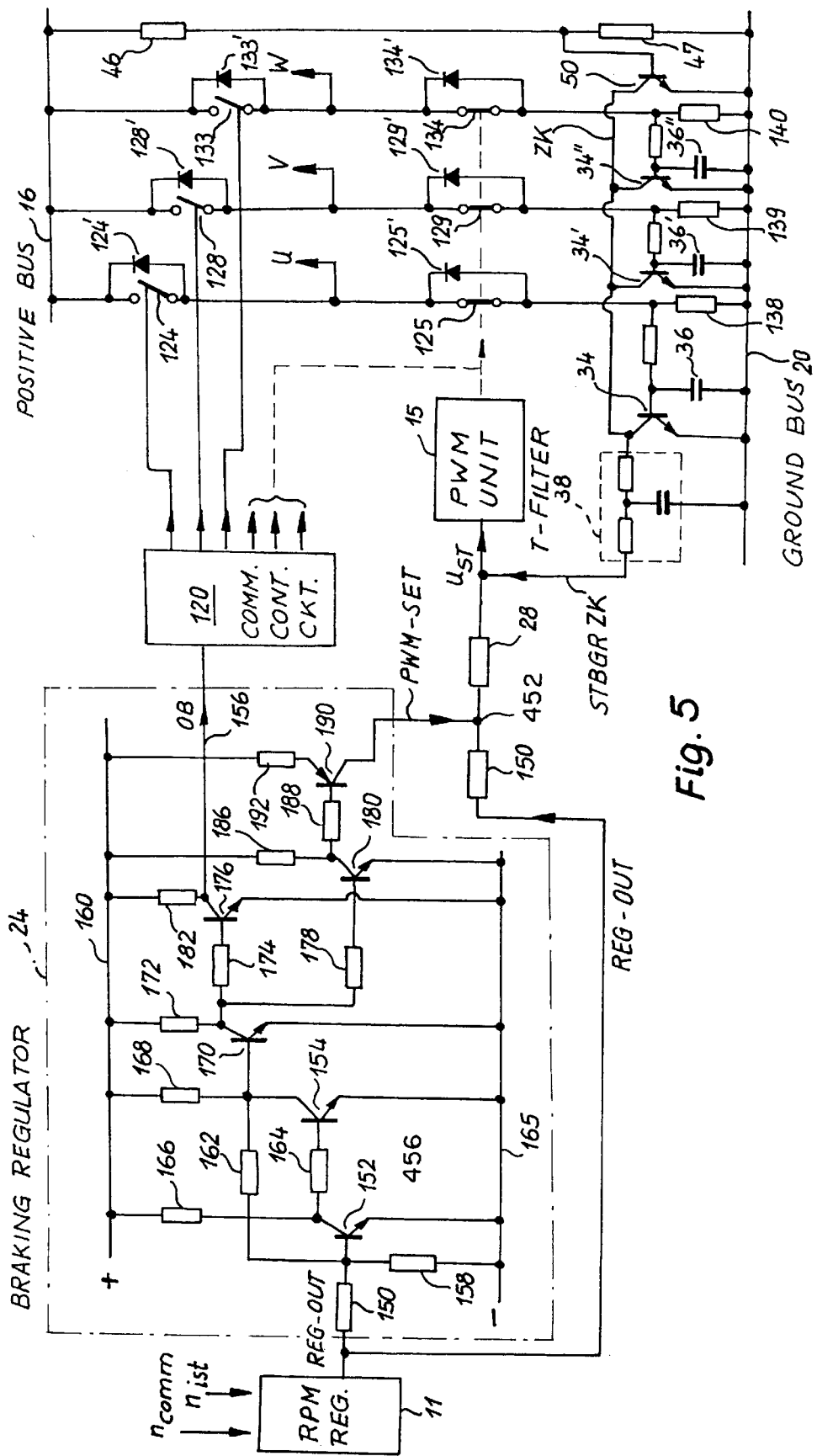
FIG. 5 is a circuit diagram showing details of the circuit of FIG. 4.

Circuit 10 further comprises a monitoring circuit 23, which monitors the voltage between positive conductor 16 and negative conductor 20, and which also serves to reduce the current in motor 12 whenever this voltage $U_{ZWK}$ becomes too high. This circuit 23 is naturally particularly advantageous if regenerative braking is used, as shown in FIGS. 4 & 5, since, during such braking processes, the voltage between conductors 16 and 20 can temporarily climb to a damaging level, which could lead to problems if this climb were not limited.

To the RPM regulator 11, there are fed, as shown in FIG. 1, an RPM target or command value $n_{comm}$ and an actual RPM value $n_{act}$ which can be supplied by, e.g. a tacho-generator (not shown) coupled to motor 12. In the case of an electronically commutated motor, this actual RPM value is preferably taken from the Hall signals of the motor.

The RPM regulator 11 generates, at its output, a regulator output signal REG-OUT which is fed to a braking regulator 24. Whenever this regulator output signal falls in a range designated by 86 in FIG. 3a, this indicates that the RPM of the motor is too high, and that motor 12 must therefore be braked. Braking regulator 24 then performs, using braking logic within itself, the following simultaneous operations: switchover of selector switch 17 into position 17', the opening of a switch 25, and the closing of a switch 26. Switch 25 serves, when closed, to supply the signal REG-OUT, via a high-value resistor 28 (e.g. 470 kΩ) to the input 30 of PWM unit 15, as a setting voltage $u_{ST}$. The PWM unit 15, as a function of the magnitude of this signal $u_{ST}$, switches the semiconductor switch 14 OFF and ON, so that the duty ratio k corresponds to the magnitude of voltage $u_{ST}$. If the signal REG-OUT is high, this means that the motor is too slow and the duty ratio k of output signal 32 of PWM unit 15 therefore goes high. The definition of duty ratio k is stated at the bottom of FIG. 3. If the RPM increases, the signal REG-OUT therefore gets smaller, and the duty ratio of signals 32 falls until it goes to zero at position B of FIG. 3a. In this case, no more current is received via semiconductor switch 14 by motor 12.

If the RPM nevertheless keeps rising, because motor 12 is driven by its load, the signal REG-OUT becomes smaller still, and at position C of FIG. 3a, the braking logic in braking regulator 24 performs the tripping of switches 17, 25, and 26.

In this manner, the signal REG-OUT is disconnected from input 30 of PWM unit 15, and, in its place, a different signal PWM-SET is applied, via switch 26 and high-value resistor 28 to the input 30 of PWM unit 15. This signal PWM-SET then determines, as new setting signal $u_{ST}$ during the braking process, the duty ratio k of the output pulses 32 of the PWM unit 15, i.e. the braking current which flows through motor 12, and this braking current is limited by the current limiter (transistor 34) provided.

If, by means of the braking process, the RPM of motor 12 declines in the direction of the desired RPM, the signal REG-OUT increases again, and when it has reached the value D shown in FIG. 3a, the braking logic in braking regulator 24 performs a new switchover of selector switch 17 into the position shown in FIG. 1, as well as a switchover of switches 25 & 26, so that the regulator output signal REG-OUT is again applied to the input of the PWM unit 15 as a control signal, and the substitute value PWM-SET is disconnected from the input.

In this manner, it becomes possible, when the desired RPM value $n_{comm}$ is exceeded, to rapidly return the RPM to the desired value and thereby to avoid driving a load at too high an RPM. Equally, when the RPM target value should rapidly be reduced, e.g. from 3000 n to 1200 n, such a braking process is automatically inaugurated, and the RPM is thus reduced, under control of the PWM unit 15, very rapidly to the newly commanded target value.

CURRENT LIMITATION

The voltage $u_m$ at the measuring resistor 18 is applied, via a resistor 32, to the base of an NPN transistor 34, whose emitter is connected to negative conductor 20. As a prefilter, between this base and negative conductor 20, a capacitor 36 is connected. The collector of transistor 34 is connected via a T-filter 38 (time element of the first order) to input 30 of PWM unit 15 and feeds to this input the signal STBGR. T-filter 38 contains two series-connected resistors 39, 40, which are arranged between the collector of transistor 34 and input 30, and a junction point 42 which is connected via a capacitor 43 (e.g. 100 nF) to negative conductor 20.

As will be immediately apparent, whenever the voltage $u_m$ at the measuring resistor 18 goes too high, the base-emitter threshold voltage of transistor 38 will be exceeded, so that the transistor becomes conductive and connects input 30 of PWM unit 15 to negative conductor 20, via resistors 39, 40. Since resistor 38 is highly resistive, while resistors 39, 40 by contrast have low resistance (e.g. 1 kΩ each), the effect of transistor 34 becoming conductive is that the voltage $u_{ST}$ at input 30 is pulled down more, the more strongly transistor 34 conducts, indeed independently of the magnitude of the signal REG-OUT or of the signal PWM-SET, i.e. the signal STBGR for current limitation is super-ordinated to these two other signals. For transistor 34, it is preferred to use transistors specially selected with regard to their base-emitter threshold voltage, in order to achieve an exactly defined onset of current limitation.

VOLTAGE LIMITATION 23

As shown at the left side of FIG. 1, this includes two voltage divider resistors 46, 47 which are connected in series between positive conductor 16 and negative conductor 20. Their junction point 48 is connected to the base of an NPN transistor 50, whose emitter is connected to negative conductor 20 and whose collector is connected to the collector of transistor 34. The signal at the collector of transistor 50 is designated ZK. If the voltage $U_{ZWK}$ between conductor 16 and 20 becomes too high, transistor 50 becomes conductive, and then forms—just as in the case of transistor 34, already described—a connection from the input of PWM unit 15 to negative conductor 20. Thereby, in this case also, the duty ratio of the PWM signals 32 is reduced to compensate for the too-high operating voltage. In this manner, there is made possible, as explained in more detail below, a very simple monitoring and limitation of the intermediate circuit voltage $U_{ZWK}$ in a motor with regenerative braking. Transistor 50 satisfies the same criteria as transistor 34 (i.e. selected for precise threshold).

Figure 2:
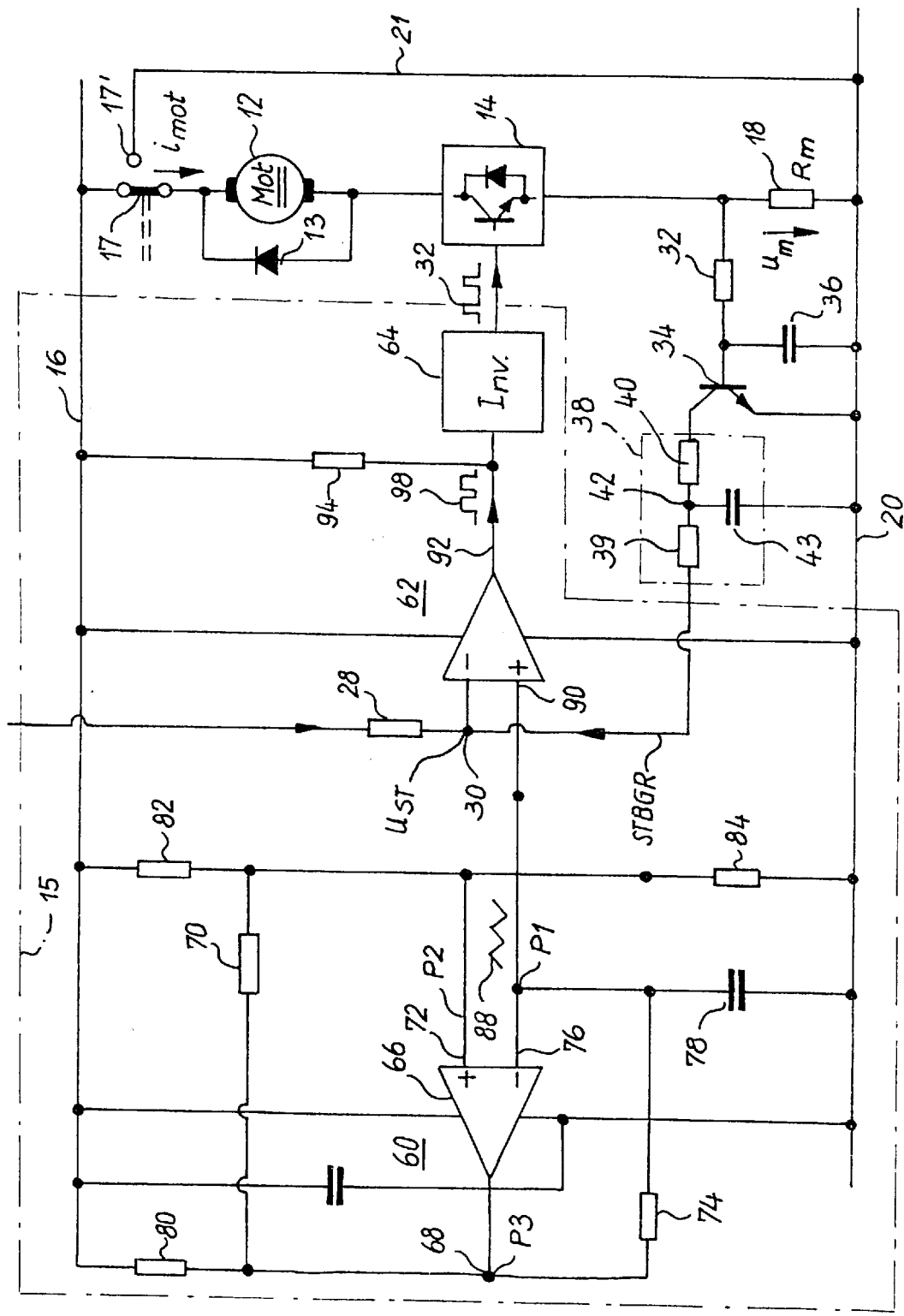
FIG. 2 is a circuit diagram showing details of the PWM of FIG. 1.

FIG. 2 explains a preferred structure of PWM unit 15, in which the delta or triangle signal 88 (FIG. 3a) used oscillates between a minimum value 91, whose magnitude is close to but different from 0 and a maximum value 93.

By The PWM unit 15 contains, as components, a delta or triangle oscillator 60 which oscillates at a frequency of, for example, 20 kHz, a comparator 62, and a signal inverter 64, at whose output the pulse-formed signal 32 arises, as shown in FIG. 3c, and which controls the current through the semiconductor switching element 14. At a duty ratio of 100%, signal 32 will become a DC voltage signal.

The triangle oscillator 60 contains a comparator 66, which preferably forms, with comparator 62, a double comparator. Both are connected to positive conductor 16 and negative conductor 20, in the usual manner, for voltage supply purposes. From the output 68 of comparator 66, a positive feedback resistor 70 (e.g. 4.3 kΩ) leads to its positive input 72, and, similarly, a negative feedback resistor 74 (e.g. 22 kΩ) leads from output 68 to negative input 76 of comparator 66. A capacitor 78 (e.g. 1 nF) is connected between negative input 76 and negative conductor 20. Further, output 68 is connected via a resistor 80 (e.g. 2.2 kΩ) to positive conductor 16. Positive input 72 is connected to positive conductor 16 and negative conductor 20, respectively, via two equally sized resistors 82, 84 (e.g. 10 kΩ each).

Such a triangle oscillator 60 oscillates with a frequency of about 20 kHz, and the triangular voltage 88 runs symmetrically with respect to about half the voltage between the conductors 16 and 20. For example, with an operating voltage of 12 V and the aforementioned values, the signal height at the lower point 91 (FIG. 3a) of triangle signal 88 is about 2 V (thus differing from 0), and the voltage at the upper point 93 is about 9 V. The triangle signal 88 thus has an offset 86 (FIG. 3a) with respect to voltage 0 V, i.e. with respect to the potential of negative conductor 20. This offset, in the embodiment described, is about 2 V, but naturally can be bigger or smaller, depending upon the dimensioning of oscillator 60.

The triangle signal 88 at the negative input 76 is fed to the positive input 90 of comparator 62. The latter's negative input corresponds to input 30 of FIG. 1, and, as already described with reference to FIG. 1, the control signal $u_{ST}$ is applied, via a high-value resistor 28, to this negative input 30. This control signal can be determined, alternatively, by signal STBGR from current limiting transistor 34, or by voltage monitoring circuit 23 (FIG. 1), or by setting value PWM-SET for braking mode, or by regulator output signal REG-OUT. The signal STBGR is determined by the height of current $i_{mot}$ in motor 12, i.e. the higher this current is (above a predetermined threshold), the more conductive transistor 34 becomes, and pulls down the potential of negative input 30, whereby the duty ratio k is reduced, and indeed the more so, the higher the motor current becomes.

The output 92 of comparator 62 is connected via a resistor 94 (e.g. 2 kΩ) to the positive conductor 16, and further to the input of the inverting element 64, at whose output the PWM signal 32 is generated, which signal controls semiconductor switching element 14.

OPERATION OF FIG. 2 CIRCUIT

For explanation of the operation of delta or triangle generator 60, reference is made to FIG. 2. Three voltages or potentials are called out, namely the potential P1 at the negative input 76 of comparator 66 (e.g. chip LM 2901), the potential P2 at its positive input 72, and the potential P3 at the output 68 of comparator 66.

Upon switching on or initialization of the circuit, potential P1 is maintained via the (discharged) capacitor 78 at the potential of negative conductor 20. This corresponds to the starting condition for a RESET. Potential P3 takes on the value of positive conductor 16, since in this case the potential of positive input 72 of comparator 66 is higher than the potential of negative input 76. Capacitor 78 therefore begins to charge through the resistors 80 and 74. This is the rising trace 87 in FIG. 3 of the delta signal 88, which corresponds to the potential P1, i.e. the voltage at capacitor 78. Potential P2 results from (a) the parallel circuit of resistors 82, 80 and 70, and (b) the magnitude of the lower voltage divide resistor 84. The resistors 82 and 84 are preferably equally large, e.g. 10 kΩ, resistor 70 is e.g. 4.3 kΩ, and resistor 80 is e.g. 2.2 kΩ. Resistor 74 is e.g. 22 kΩ. Given an operating voltage of 12 V between conductors 16 and 20, the potential P2 in this case is about 9 V.

Through the charging of capacitor 78, potential P1 eventually becomes higher than potential P2, and thereby switches over output 68 to the potential of negative conductor 20, i.e. potential P3 makes a jump in the negative direction. Therefore capacitor 78 begins to discharge itself via resistor 74; this is the falling voltage trace 89 (FIG. 3) of delta or triangle signal 88. Potential P2, i.e. the threshold value of comparator 66, hereby changes, and now results from (a) the parallel circuit of resistors 84 and 70 and (b) the voltage divider resistor 80. This new potential P2 is approximately 2 V.

If, due to the discharge of capacitor 78, potential P1 falls below potential P2, comparator 66 switches back to logical "one" i.e. potential P3 at its output goes HIGH again.

The above-described process repeats itself periodically, and potential P1 therefore climbs again to the potential P2 specified by resistors 80, 70, and 82. Then potential P3 at output 68 of the comparator jumps back down to the potential of the negative conductor, etc. In this manner, the triangle signal is formed.

The charging time of capacitor 78 results from the series circuit of resistors 80 and 74. Its discharging time results from the resistor 74. The potential P2 at positive input 72 oscillates, given the values described, between about 9 V and 2 V, and is approximately symmetrical about an average voltage of about 5.5 V, about half of the voltage difference between conductors 16 and 20. A slight asymmetry of signal 88 results from resistor 80.

It is significant that a duty ratio k of 0% is reached at a voltage of 2 V and below, so that in the entire voltage range from 0 to 2 V, the motor current is held at 0. This is particularly advantageous in the case of current limitation of the sort illustrated since, even at a high value of signal $u_m$ at measuring resistor 18, therefore at a high motor current $i_{mot}$, the signal at the output of T-filter 38, which is fed to the negative input 30 of comparator 62, does not fall all the way to the potential of negative conductor 20, but rather remains somewhat positive. This small residual voltage is, however, within the voltage range of 0 V to 2 V, so that the current limitation functions reliably despite such a small residual voltage. In other words, in operation the potential P1 at the positive input of comparator 62 does not fall below 2 V, so that every potential at the negative input of comparator 62 which is under 2 V results in a duty ratio of PWM signal 32 of 0%. During normal operation the current limitation causes only a reduction of the motor current, i.e. the potential at point 30 lies in the range above 2 V, corresponding to a duty ratio k of greater than 0%. However, the onset of current limitation mode pushes the duty ratio to a lower value.

The use of the offset region 86 (FIG. 3) also avoids the occurrence of defective current limitation, in the event transistors 34 or SO have strong tolerance deviations. Further, for control of the braking process, the circumstance is used, that, at an excessive RPM, the regulator output signal REG-OUT falls in the range from 0 to 2 V. Therefore, whenever REG-OUT is in this voltage range, the braking regulator 24 and the braking logic are actuated, in order to initiate a braking process of motor 12, as already described with reference to FIG. 1.

During operation, the delta or triangle oscillator 60 thus generates the triangular voltage pattern 88 shown in FIG. 3a. As a function of the height of the potential at the negative input 30 of comparator 62, which is designated in FIG. 3a as $u_{30}$, one obtains, at the output of comparator 62, square-wave pulses 98 which become shorter, the higher the potential $u_{30}$ at negative input 30 becomes. The height of this potential thus determines the duty ratio of pulses 98, and the inverting element 64 inverts these pulses, and one obtains, at the output of inverting element 64, the PWM-pulses 32, whose duty ratio k, defined at the bottom of FIG. 3, also depends upon the height of control signal $u_{ST}$ at negative input 30. If this signal becomes more positive, the duty ratio k (and therewith the motor current) increase, and, if this signal becomes more negative, the duty ratio (and therewith the motor current) decrease.

During normal operation, the positive regulator output signal REG-OUT is applied via the high-value resistor 28 to the negative input 30. This then determines the duty ratio of the PWM-signal 32. If the current through motor 12 increases above a predetermined limit value, transistor 34 becomes conductive, thereby applying to negative input 30 the signal STBGR, i.e. the potential at this input jumps in the negative direction, because a current flows from input 30 via transistor 34 to negative conductor 20. Thereby, the duty ratio k of the PWM pulses 32 decreases; indeed, it decreases more, the higher the motor current goes. In this manner, one obtains a gentle current limitation, which operates practically in an analog manner, and which causes no additional motor noises or additional EMF disturbances. In the same way, the current limitation works if, during a braking process, the signal PWM-SET is applied to the negative input 30.

In the circuit of FIG. 1, mechanical switches 17, 25 and 26 are used for switchover to braking mode, triggered by a low value of the signal REG-OUT. In the case of the regulator, this is less desirable, since such switches cause noises and have a limited service life.

FIG. 4 therefore illustrates a circuit 110 embodiment of the present invention, in which the switches used are electronic, and in which an electronically commutated motor (ECM) is used as the motor 112. Components equivalent or functionally equivalent to those in the preceding figures are designated here with the same reference numerals and are generally not described again.

ECM 112 is shown here—as an example—triple-stranded, with three stator strands (stator phases) U, V and W, which in this example are connected in a star pattern. Equally possible would be a triangular circuit, or a different strand count. The motor operates six-pulsed; i.e. per rotor turn of 360° el, the stator receives six current pulses. The reader is referred to the article of Dr. Rolf Müller in *ASR-Digest für angewandte Antriebstechnik* [ASR-Digest for Applied Drive Technology], pages 27–31 (1977), where many of such motors are described. The permanent-magnet rotor of this motor 112 is designated 113, and is only schematically illustrated. Clearly, motor 112 could also have a rotor 113 excited by supply of current, instead of a permanent-magnet rotor.

Motor 112 has, in this version, three Hall generators 115, 116, and 117 whose output signals are fed to a commutation control circuit 120, which derives from these Hall signals an RPM-instantaneous-value signal $n_{ist}$, which in turn is applied to an RPM-regulator 11, usually a proportional-integrating (PI) regulator. Further, commutation control circuit 120 is equipped to supply, in the usual manner, commutation signals for the semiconductor switches of a bridge circuit 122. The form of these commutation signals is determined by the output signal of the PWM unit 15, i.e. these signals are continually switched ON and OFF by the PWM signal at a high frequency (e.g. 20 to 25 kHz), as is described below with reference to FIG. 11, cf. there the logical conjunction of the PWM signals 32 with the rotor position signals H1 and H2, in order to control bridge transistor 125.

The Hall generators are only shown schematically. Operation without Hall generators is also possible, if so-called "sensorless technology" is used.

The commutation control circuit 120 is thus configured in the usual way, in order to control the six controllable semiconductor switches of the full bridge circuit 122. For ease of illustration, these semiconductors are shown as mechanical switches but, in reality, they are power transistors, e.g. MOSFETs (Metal Oxide Semiconductor Field Effect Transistors).

A first branch of bridge circuit 122 contains two semiconductor switches 124, 125, at whose junction 126 the motor winding strand U is connected. A second branch contains two semiconductor switches 128, 129, at whose junction 130 the motor winding strand V is connected. A third branch contains a semiconductor switch 133 above and a semiconductor switch 134 below, at whose junction 135, the motor winding strand W is connected. As shown in FIG. 4, connected anti-parallel to each individual semiconductor switch is a respective diode 124', 125', 128', 129', 133' and 134'.

The upper semiconductor switches 124, 128, and 133 are each connected to a positive conductor 16. In series with the respective lower semiconductor switches 125, 129, and 134 is a respective current measuring resistor 138, 139, or 140, which are all connected to a negative conductor 20. Between conductors 16 and 20 is a so-called intermediate circuit voltage $U_{ZWK}$ of, e.g. 24 V, which, upon regenerative braking operation of motor 112, can climb to more than double that value. For this reason, the voltage limitation 23 previously described with reference to FIG. 1 is provided. This limits the intermediate circuit voltage, during braking operation, to an upper value of, e.g. 48 V.

The external terminals for current supply are designated 16' and 20' respectively. From terminal 16', a fuse 142 leads to a filter capacitor 143 and a protective diode 144 which protects against high overvoltages, e.g. against voltages of more than 68 V. In addition to fuse 142, a filter coil 146 is also connected between terminal 16' and positive conductor 16. To the left of coil 146, a further filter capacitor 148 is provided. The voltage monitoring circuit 23 is, as shown, arranged parallel to this filter capacitor 148 and corresponds exactly in its structure to circuit 23 shown in FIG. 1, so that one can refer to that description.

The voltage on measuring resistor 138 is, fully analogous to FIG. 1, fed via a resistor 32 to the base of an NPN-transistor 34, to which a filter capacitor 36 is connected. The collector of transistor 34 is connected via T-filter 38 to input 30 of PWM unit 15.

To the measuring resistors 139 and 140 are associated, as shown, analogous measuring circuits, which therefore are designated with the same reference numerals, with one or two primes added. The collectors of the four transistors 34, 34', 34" and 50 are connected with one another, and these four transistors are selected transistors having essentially identical base-emitter threshold voltage $U_{BE}$, so that they all become conductive at the same voltage and thereby open a connection from input 30 to negative conductor 20, whereby the control voltage $u_{ST}$ on input 30 is reduced, thereby reducing the duty ratio k.

The regulator output signal REG-OUT of the RPM regulator 11 is fed to braking regulator 24, and it is fed via a resistor 150 (e.g. 22 kΩ) to a node 452, which in turn is connected via the high-value resistor 28 (e.g. 460 kΩ) to input 30 of PWM unit 15.

Braking regulator 24 then generates, at its output 454, the signal PWM-SET which substitutes for signal REG-OUT, whenever the RPM of motor 112 has risen so far above the preset value that REG-OUT has reached the low value C shown in FIG. 3a. Since REG-OUT is fed to node 452 via the relatively high-value resistor 150, and PWM-SET is fed directly, signal PWM-SET, when it occurs (at high RPM of motor 112), replaces (substitutes for) signal REG-OUT.

When braking regulator 24 generates the signal PWM-SET at its output 454, it also generates, at its output 156, a signal OB which is fed to commutation control circuit 120, whereby this circuit opens the upper semiconductor switches 124, 128 and 133 of bridge circuit 122 (makes them non-conductive), and switches on the lower bridge switches 125, 129, and 134 (makes them continuously conductive), as shown in the example of FIG. 4. Motor 112 then operates as a generator, and its generated voltage is fed via diodes 124', 128' and 133' to positive conductor 16, so that the intermediate circuit voltage on this conductor can rise considerably, as previously described, and can lead to damage resulting from overvoltage.

Also, during such a braking process, substantial generated currents can flow in motor 112, which can lead to a partial demagnetization of the permanent magnets used in the motor, and that must be absolutely avoided.

A voltage rise of the intermediate circuit voltage, e.g. beyond 48 V, is avoided by the voltage monitoring circuit 23, since in that event the latter's transistor 50 becomes conductive and reduces the control voltage $u_{ST}$ at input 30 of PWM unit 15, so that unit 15 periodically opens and closes the lower bridge transistors 125, 129 and 134 according to the duty ratio k, which in turn corresponds to the control voltage $u_{ST}$. In this way, the intermediate circuit voltage $U_{ZWK}$ is reliably limited.

A too-high current through the stator winding strands U, V or W is prevented by measuring resistors 138, 139 and 140, which are associated respectively with strands U, V, W and which, upon over-current, actuate the individual transistors 34 or 34' or 34", which then reduce the voltage $u_{ST}$ at input 30 and thereby reduce duty ratio k more strongly, the higher these currents become.

Since, during such a transient braking process, not only the generator-created voltage of motor 112, but also its stator currents, are limited, one can term this limitation a "power limitation" or "wattage limitation", i.e. the braking process executes quickly, but strictly within the power limits of the connected motor 112. In practice, such a braking process generally lasts only a few seconds; in the case of a roller shutter motor, it lasts, for example, about 30 seconds. After a change in the RPM target value, the desired RPM is achieved within a short time, and practically without bucking.

After the braking process, when the motor operates again at the desired RPM, the regulator output signal REG-OUT climbs again, and, when it reaches the value D shown in FIG. 3a, the signals PWM-SET and OB are again switched off. At input 30, the signal REG-OUT is again effective and the commutation control circuit 120 again carries out a normal commutation of the bridge circuit 120 in motor mode. Since such bridge circuits are familiar in numerous variations, this normal motor mode need not be described here.

FIG. 5 illustrates details of FIG. 4, and identical or functionally equivalent components are designated with the same reference numerals as before and are generally not described again. Also, not all details of FIG. 4 are repeated again, but rather only the significant portions.

The components of braking regulator 24 are surrounded by a dash-dotted line. From the output of RPM regulator 11, where the output signal REG-OUT arises during operation, a resistor 150 leads to the base of an NPN-transistor 152 which, together with another NPN-transistor 154, forms a flip-flop stage 456 which has a switching hysteresis and switches into braking mode whenever the signal REG-OUT in FIG. 3a reaches the low value C, and switches back into motor mode (with RPM regulation) whenever REG-OUT again reaches the higher value D shown in FIG. 3a.

For current supply to the flip-flop stage 156 and to the components connected thereto, a regulated DC voltage of, e.g. 12 V, is used, between a positive conductor 160 and a negative conductor 165, the latter being, like negative conductor 20, connected to ground (GND).

The base of transistor 152 is connected via a resistor 158 to negative conductor 165 and via a resistor 162 (e.g. 100 kΩ) to the collector of transistor 154, whose base, in turn, is connected via a resistor 164 (e.g. 22 kΩ) to the collector of transistor 152. The collectors of transistors 152, 154 are connected via respective resistors 166, 168 (e.g. 22 kΩ) to the positive conductor 160.

To the collector of transistor 154, there is connected the base of a transistor 170, whose emitter is connected to negative conductor 165 and whose collector is connected via a resistor 172 to positive conductor 160, via a resistor 174 to the base of an NPN-transistor 176, and via a resistor 178 to the base of an NPN-transistor 180.

The emitter of transistor 176 is connected to negative conductor 165, and its collector is connected via a resistor 182 to positive conductor 160. At this collector, during a braking process, there is generated the signal OB, which, by means of the commutation control circuit 120, opens the upper bridge transistors 124, 128, and 133, and makes the lower bridge transistors 125, 129, and 134 conductive, insofar as no overriding PWM-signal of PWM unit 15 is present for the lower bridge transistors.

The emitter of transistor 180 is connected to negative conductor 165, its collector is connected via a resistor 186 to positive conductor 160, and via a resistor 188 to the base of a PNP-transistor 190. The emitter of transistor 190 is connected via a resistor 192 (e.g. 2.2 kΩ) to positive conductor 160. Its collector, at which, during a braking process, when transistor 190 conducts, the signal PWM-SET is present, is connected to node 452 between resistors 150 and 28.

MODE OF OPERATION

If the signal REG-OUT is high enough, i.e. falls above value B shown in FIG. 3a, transistor 152 is conductive, and therefore transistor 154 of flip-flop stage 456 is blocked.

If, because the RPM rises to too high a value, signal REG-OUT goes very low and passes below value C of FIG. 3a, then transistor 152 blocks, and transistor 154 becomes conductive, whereby the switchover by stage 456 occurs suddenly.

Whenever transistor 154 becomes conductive, the previously conductive transistor 170 blocks, and in its turn makes transistor 176 conduct, so that, at the latter's collector, the (low) signal OB for the commutation control circuit 120 is generated.

Similarly, the blocked transistor 170 makes transistor 180 conduct, and the latter, in its turn, makes transistor 190 conduct, so that the latter generates the signal PWM-SET, which is fed as a replacement value (in place of the signal REG-OUT) to the PWM unit 15 during the braking process. Thus, during the braking process, the duty ratio k of PWM unit 15 is specified, insofar as no—overriding—current limitation and/or—likewise overriding—voltage limitation is activated.

In this manner, therefore, a switchover occurs purely electronically and with high reliability, as symbolized in FIG. 1 by switches 25 and 26. The hysteresis between points C and D of FIG. 3a, is settable by means of the switch elements of stage 456. The value D should lie near the value B. The latter corresponds to the lower end of the adjustment range for the duty ratio k.

Alternatively, it is also possible to make the magnitude of the replacement value PWM-SET a function of how large the deviation of signal REG-OUT from value B is, i.e. upon small overstepping of the desired RPM only weak braking is caused, but upon great overstepping, stronger braking is caused. This improved alternative is shown in FIG. 6.

This figure thus shows a variant to the circuit of braking regulator 24 shown in FIG. 5. Whereas, in FIG. 5, upon switchover to braking, a constant replacement value PWM-SET is generated, in FIG. 6, this replacement value is a function of how great the overstepping of the desired RPM $n_{comm}$ is: if this RPM is only slightly overstepped, only a low replacement value is generated, i.e. the duty ratio of the PWM signals 32, which specify the height of the braking current during the braking process, becomes in this case relatively small. However, if this RPM is strongly overstepped, a higher replacement value is generated, and the braking current goes correspondingly higher. This has the advantage that the switch-on and switch-off of braking is carried out free of bucking, i.e. the transition to braking, and the transition from braking mode to motor mode, occurs gently and without noticeable discontinuities.

Figure 6:
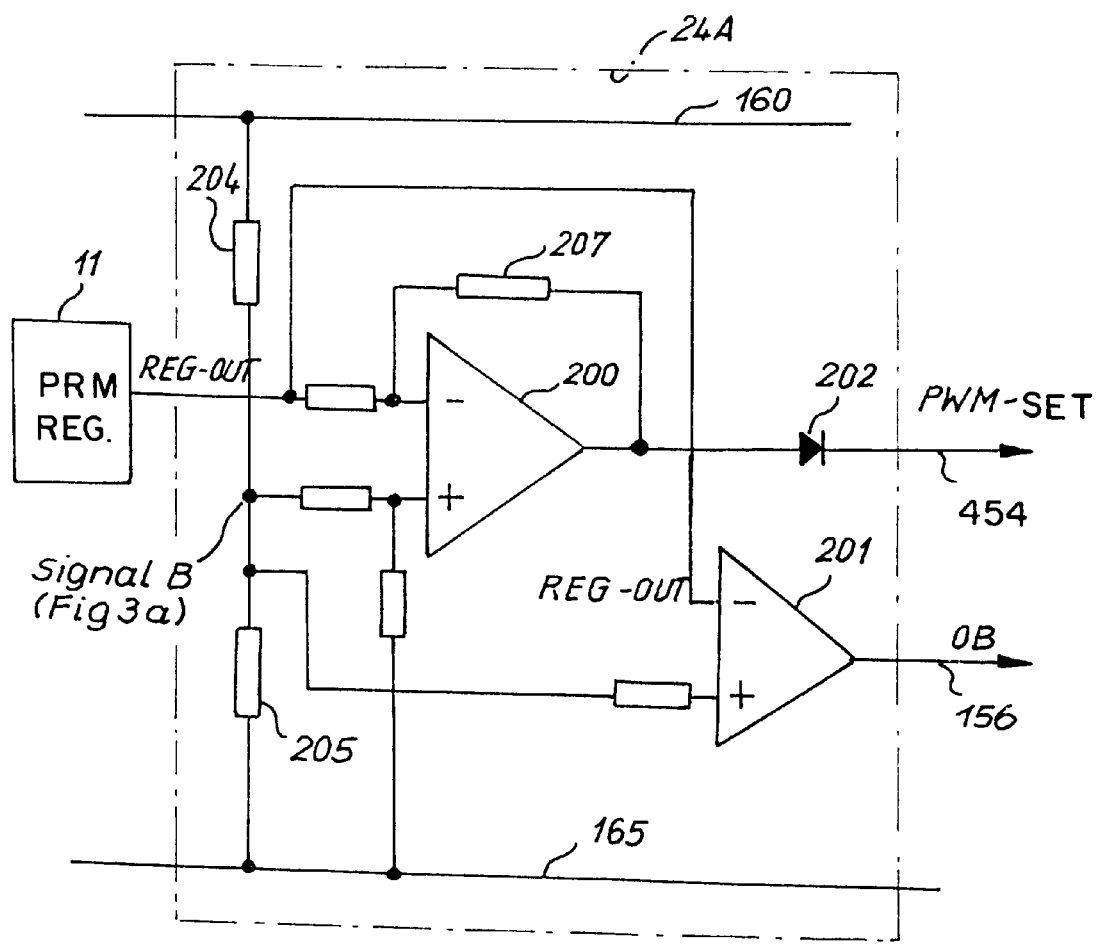
FIG. 6 is a circuit diagram showing a variant of FIG. 5.

According to FIG. 6, two operational amplifiers 200, 201 are used. To the positive inputs of both amplifiers is applied a potential from a correspondingly-set voltage divider composed of two resistors 204, 205. This corresponds to the potential B of FIG. 3a, and thus to the value of $U_{ST}$ at which the duty ratio k reaches the value 0%. This corresponds to the bottom point 91 of delta signal 88, and thus in the example, about +2 V.

The regulator output signal REG-OUT from RPM regulator 11 is fed, in the manner shown, to the negative input of both operational amplifiers 200, 201. The negative input of operational amplifier 200 is connected via a resistor 207 to its output, so that this operational amplifier performs as an amplifier with adjustable amplification, and this output is connected via a diode 202 to a terminal, designated in FIG. 4 as 454. At this terminal, upon braking, the replacement value PWM-SET arises. Since operational amplifier 200, as previously stated, performs as an amplifier, the signal PWM-SET=0 whenever the signal REG-OUT is higher than potential B. If REG-OUT becomes lower, then PWM-SET grows progressively, the lower REG-OUT becomes, i.e. braking begins with a very low braking current and, at the end of the braking process, there is a similarly low braking current, which transitions practically unnoticeable to the value zero, before the motor mode (with normal RPM regulation by the signal REG-OUT) resumes.

Operational amplifier 201 is connected as a comparator and generates, at its output, the signal OB, whenever REG-OUT becomes lower than potential B. This signal OB has the effect that the upper semiconductor switches 124, 128 and 133 of bridge circuit 122 go open, the lower semiconductor switches 125, 129, and 134 go closed, and these lower semiconductor switches are subjected to control by the PWM signals 32. This is further explained below.

FIG. 7 shows again—in the form of a block diagram—the basic structure of the electronics for the ECM 112. The motor employs in this example three Hall generators 115, 116, and 117 which are actuated by rotor magnet 113, and generate respective Hall signals H1, H2, and H3, which are fed to commutation control circuit 120, which in turn controls the bridge circuit 122. The upper three traces in FIG. 9 illustrate Hall signals H1, H2, H3. The PWM unit 15 (FIG. 2) acts on the commutation circuit 120 (cf. subsequent FIG. 11), and so does the signal OB from the braking logic shown in FIGS. 4, 5, & 6.

FIG. 8B shows the principal structure of bridge circuit 122 with three upper PNP bridge transistors 124, 128, and 133 and three lower NPN transistors 125, 129, and 134. FIG. 8A shows the associated control signals from the Hall generators 115, 116, and 117. For example, the upper bridge transistor 124 is controlled by signal T1 formed from the logical conjunction of Hall signal H1 and negated Hall signal H2/. FIG. 8A shows the logical equations for all six bridge transistors. These equations relate to operation without PWM control. This has, during normal operation (with commutation) no influence on the upper bridge transistors. During braking mode, for the upper bridge transistors, a conjunction with the signal OB (at output 156) is added, i.e. whenever OB=1, the upper bridge transistors become blocked.

With respect to the lower bridge transistors, the signal OB=1 has the effect that they conduct continuously and only block if signal 32 of PWM unit 15 (FIG. 2) is low, i.e. here there is an additional conjunction with the PWM signal 32, in order to enable a limitation of the motor current or the voltage $U_{ZWK}$ (upon regenerative braking). Compare the subsequent FIG. 11.

FIG. 9 shows the Hall signals H1, H2, and H3, and the commutation of strands U, V and W (lower three traces) of the ECM 112, for the case in which no RPM regulation, no braking, and also no current limitation occur.

Figure 10:
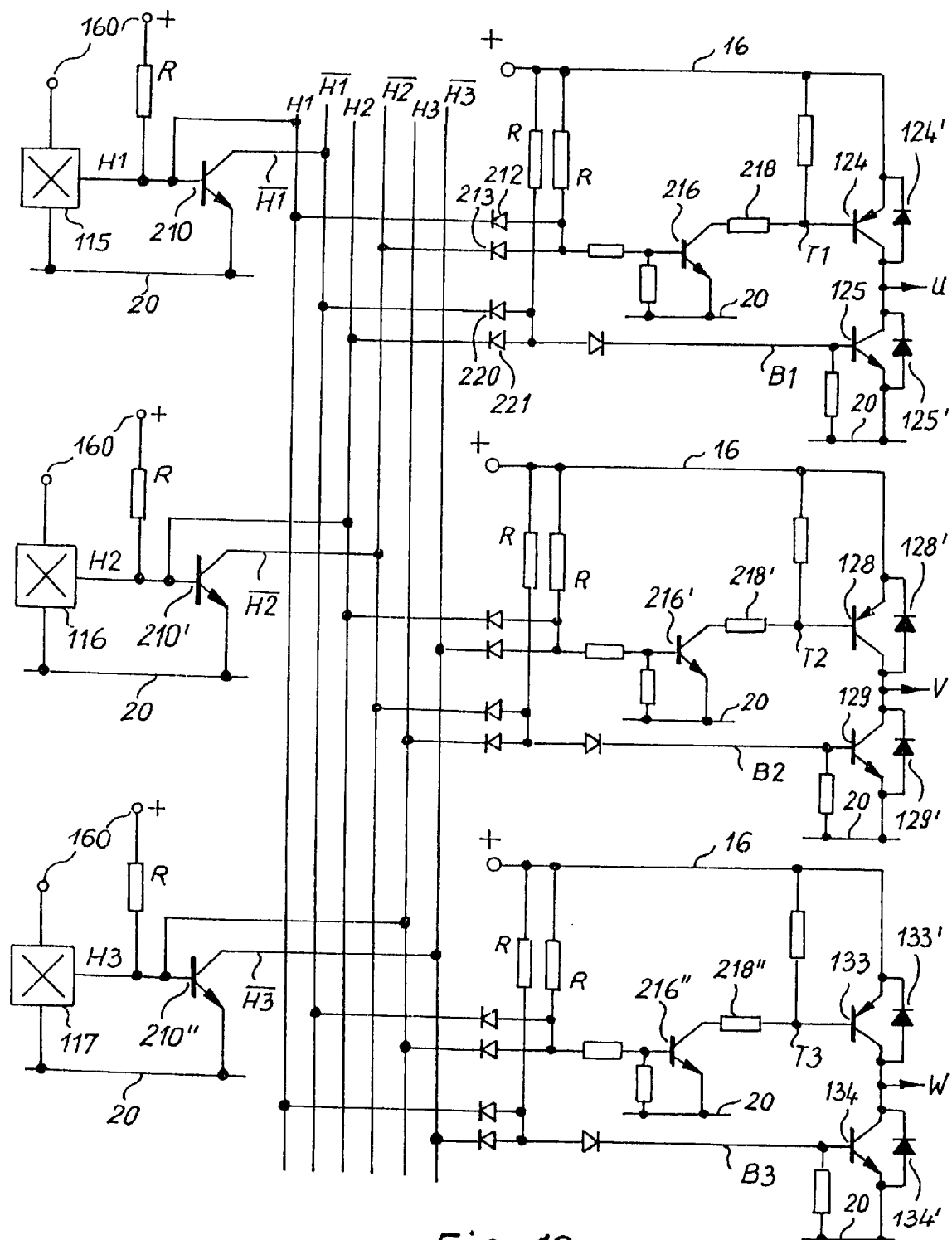
FIG. 10 illustrates commutation control for the motor of FIG. 7.
Figure 11:
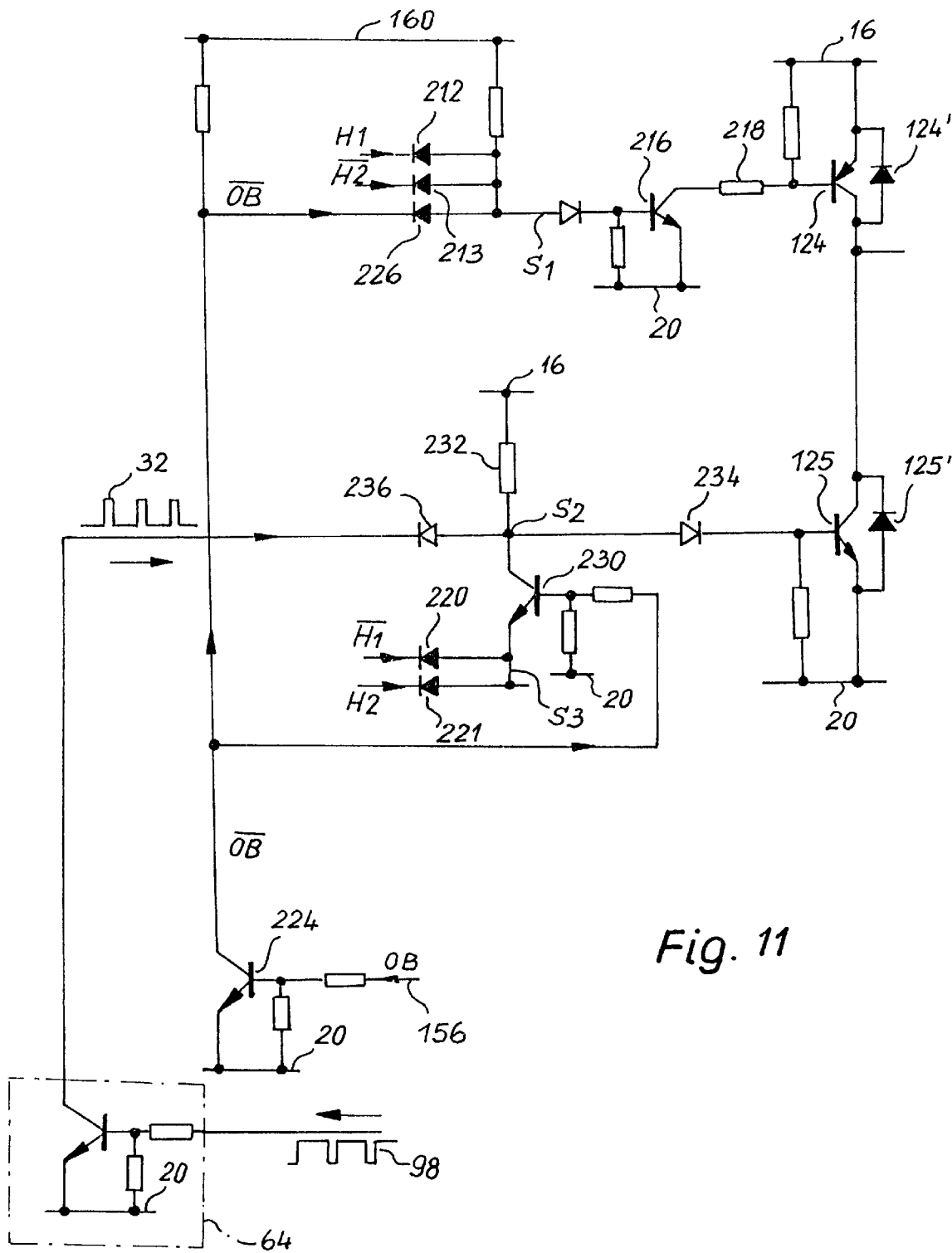
FIG. 11 is a circuit diagram analogous to FIG. 10, which contains those additional elements which are necessary for the braking mode operation of the motor and for its PWM control.

FIG. 10 shows the evaluation of the Hall signals H1, H2 and H3 and the—each inverted by a respective transistor 210, 210' and 210"—Hall signals H1/, H2/ and H3/, for driving bridge transistors and, indeed, for didactic reasons, initially without PWM regulation (the latter will be shown in FIG. 11).

As one will recognize, the three segments of the circuit according to FIG. 10 are constructed substantially identical, with the exception of the Hall signals used for driving, as set forth in FIG. 8A.

As previously described (FIG. 8A), driving of upper bridge transistor 124 is done by signals H1 and H2/, which are fed via two diodes 212, 213 (serving as AND-gates) to the base of a phase reversal (NPN) transistor 216, whose collector is connected via a resistor 218 to the base of bridge transistor 124. If the signal H1 or the signal H2/ is low, then transistor 216 blocks, and, through it, bridge transistor 124 blocks. If both signals H1 and H2/ are high, it follows that bridge transistor 124 conducts.

The lower bridge transistor 125 is similarly driven by signals H1/ and H2 via two conjunction diodes 220, 221 operating as an AND-gate. If both signals are high, bridge transistor 125 conducts; otherwise, it blocks.

Bridge transistor 128 is driven, in analogous fashion, by its driver transistor 216', and bridge transistor 133 is driven by its driver transistor 216". For those skilled in the art, everything of significance can be read from the circuit.

FIG. 11 shows only the driving of both bridge transistors 124 and 125, since the driving of the other bridge transistors is performed in a fully analogous way.

It is performed as follows:

a) The supplemental driving of lower bridge transistor 125 by PWM signal 32 (FIG. 2) occurs in case of:

a1) limitation of current flowing through the driving motor 112;

a2) limitation of current flowing through braking motor 112;

a3) RPM regulation of the motor; and a4) limitation of voltage $U_{ZWK}$ during braking.

b) switchover of bridge 122 by the signal OB (from the braking logic) e.g. in FIG. 6 from op-amplifier 201.

The signal OB is inverted by an NPN transistor 224, at whose output one obtains the signal OB/, which is thus LOW when OB is HIGH.

Signal OB/ is fed via a diode 226 to a node S1 to which the diodes 212 and 213 are also connected. One thus obtains at S1 the logical conjunction H1&H2/&OB/, i.e. whenever OB/ is LOW, the upper bridge transistor 124 blocks, and in analogous fashion the upper bridge transistors 128 and 133.

The signal OB/ is also fed to the base of an NPN transistor 230 and blocks the latter when low, whereby the base of bridge transistor 125 constantly obtains, via a resistor 232, a turn-on current from the positive conductor, i.e. during braking the lower bridge transistors are continuously switched on, and the commutation is shut off. For this purpose, the emitter of transistor 230 is connected via diode 220 to signal H1/ and via diode 221 to signal H2. The collector of transistor 230 is connected to a node S2 and via resistor 232 to positive conductor 16.

From node S2, a diode 234 leads to the base of bridge transistor 125. Similarly, node S2 is connected via a diode 236 to the output of inverter 64 (cf. FIG. 2) and there obtains the PWM signal 32. Each time that this signal 32 goes low, node S2 receives a low potential, and blocks the lower bridge transistor 125. Conversely, if PWM signal 32 is high, bridge transistor 125 remains conductive, whenever it is driven to conduct by the other signals (signal OB/, or the combination of signals H1/ and H2). The same applies for both the other lower bridge transistors 129 and 134.

PWM signal 32 thus has precedence here, i.e. whenever it goes low, it blocks bridge transistor 125 in any case, and, in analogous fashion, bridge transistors 129 and 134, so that the current in the motor is interrupted, whenever the PWM signal is low. In this way, as described above, current limitation during braking and a limitation of voltage $U_{ZWK}$ are made possible.

In this manner, during normal operation, thus with commutation, each of the lower bridge transistors 125, 129 and 134 are blocked by the PWM signal 32 whenever the motor current becomes too high. Upon braking, the lower bridge transistors become non-commutating, but basically constantly conductive due to the signal OB from the braking logic. Moreover, during braking, these transistors are opened (by the PWM signal) whenever the braking current and/or the intermediate circuit voltage $U_{ZWK}$ become too high.

Naturally, numerous changes and modifications are possible within the scope of the inventive concept, so that the invention is not limited to the particular embodiments shown and described. In particular, features of one embodiment may be combined with features of another embodiment.

What is claimed is:

1. A method of controlling an electric motor having a control circuit including at least one semiconductor switch, gating current supplied to the motor, and a Pulse Width Modulation unit (PWM) applying pulses with a variable duty ratio k to the at least one semiconductor switch, said duty ratio being controllable by an analog control signal applied to said Pulse Width Modulation unit, said duty ratio changing upon variation of said analog control signal within a first predetermined signal range (A–B). said duty ratio being essentially constant and zero when said analog control signal has a value within a second predetermined signal range (86) adjacent said first predetermined signal range, so that changing said analog control signal in a direction from said first predetermined signal range to said second predetermined signal range will cause a reduction of the duty ratio when occurring in said first predetermined signal range, will cause a reduction of the duty ratio to zero when occurring at a transition between said signal ranges, and will maintain the duty ratio at zero when occurring in said second predetermined signal range, comprising the steps of:

feeding a first analog signal, which is a function of at least one first motor parameter, to said Pulse Width Modulation unit as an analog control signal therefor;

generating a second analog signal, which is a function of at least one second motor parameters and changing the actual value of said first analog signal in a direction from said first predetermined signal range toward said second predetermined signal range when said second analog signal exceeds a predetermined value.

2. The method of claim 1, wherein the first analog signal is a speed control signal of the motor.

3. The method of claim 1, further comprising deriving the second analog signal by measuring at least one value of current ($i_{mot}$) flowing in the motor, filtering a signal resulting from said measurement, and using the filtered signal as the second analog signal.

4. The method of claim 3, wherein said electric motor is an electronically commutated motor having a plurality of winding phases, further comprising separately measuring current passing through individual winding phases, determining which of said winding phases has the instantaneously largest current value, and deriving said second analog signal from said largest value.

5. The method of claim 1, wherein said electric motor (122) is connected between two conductors (16, 20) between which a dc voltage ($u_{ZWK}$) is maintained, said motor furnishing energy to said conductors during regenerative braking, further comprising the step of deriving said second analog signal from the magnitude of said dc voltage ($u_{ZWK}$) between said two conductors.

6. The method of claim 1, wherein, in said second predetermined signal range (86), a non-zero analog control signal ($u_{ST}$) below a predetermined value, supplied to said pulse width modulation unit, results in a duty ratio k of 0%.

7. The method of claim 1, further comprising the step of when the first analog signal has a value within a predetermined signal range, applying a different analog signal (PWM-SET) to said PWM unit (15) instead of said first analog signal.

8. The method of claim 7, further comprising the step of deriving said different analog signal (PWM-SET) from the magnitude of an output signal (REG-OUT) of a speed controller associated with said motor.

9. The method of claim 7, further comprising the step of deriving said different analog signal (PWM-SET) from the magnitude of a value of a braking current passing through said motor.

10. An apparatus for controlling an electric motor (12; 112) including a Pulse Width Modulation (PWM) unit 15 which supplies pulses having an adjustable duty ratio k to at least one semiconductor switch (14; 124, 125, 128, 129, 133, 134) which gates current to windings of said motor, wherein
said PWM unit is controllable by an input signal $u_{ST}$;
said duty ratio changing upon variation of said input control signal within a first predetermined value range (A–B), but being invariant and zero in a second predetermined value range (86) adjacent to said first predetermined value range (A–B), so that changing said input control signal in a direction from said first predetermined value range to said second predetermined value range will cause a reduction of the duty ratio when occurring in said first predetermined signal range, will cause a reduction of the duty ratio to zero when occurring at a transition between said signal ranges, and will maintain the duty ratio at zero when occurring in said second predetermined signal range,
said at least one semiconductor switch repetitively opening and closing in accordance with the duty ratio of said pulses received by said semiconductor switch from said pulse width modulation unit (15);
and a control circuit (11) controlling a motor parameter and generating an output signal (REG-OUT) which is applied to said PWM unit as an input control signal therefor, said output signal having a signal value range spanning said first predetermined value range (A–B) and at least part of said second predetermined value range (86) of said PWM unit (15).

11. The apparatus of claim 10, wherein said motor is switchable between a motor operation mode and a braking mode, as a function of said output signal REG-OUT;
said output signal (REG-OUT) assuming a value in said second predetermined value range and triggering switchover to said braking operation mode when motor speed exceeds a predetermined upper limit, in order to swiftly reduce motor speed to a safe value.

12. The apparatus of claim 11, wherein, when said output signal (REG-OUT) assumes a value (C) corresponding to an excessive motor speed, said value lying in said second predetermined value range, a different signal (PWM-SET) is applied to said PWM unit (15) instead of said output signal (REG-OUT).

13. The apparatus of claim 12, wherein the value of said different signal (PWM-SET) is a function of the value of said output signal (REG-OUT).

14. The apparatus of claim 12, wherein the value of said different signal (PWM-SET) is a function of the value of braking current passing through said motor (12, 112).

15. The apparatus of claim 10, further comprising a resistor network (150, 28, 39, 40) which, during operation, furnishes one out of a plurality of different signals (REG-OUT, PWM-SET, STBGR, ZK), having a precedence hierarchy with respect to each other, to an input of said PWM unit (15) as an input control signal therefor.

16. The apparatus of claim 10, further comprising a subcircuit (23, 46, 47, 50) which monitors an operating voltage ($U_{ZWK}$) of said motor and derives therefrom a voltage-dependent signal (ZK) which, in a predetermined value range thereof, takes precedence over other signals (REG-OUT, PWM-SET) as an input control signal of said PWM unit (15).

17. The apparatus of claim 16, wherein said operating voltage monitored ($U_{ZWK}$) is a dc voltage between two conductors (16, 20) which supply operating current to said motor.

18. The apparatus of claim 10, further comprising a subcircuit (34, 32, 18) which monitors motor current and derives therefrom a current-dependent setting signal (STBGR) which, in a predetermined value range thereof, takes precedence over other signals applied to an input of said PWM unit (15) to control said duty ratio.

19. The apparatus of claim 10, wherein said first predetermined input signal range (A–B) of said PWM unit (15) has an offset (86) with respect to voltage zero, so that, in a value range of said input control signal $u_{ST}$ situated within this offset (86), said PWM unit (15) sets a duty ratio k of 0%.

20. The apparatus of claim 10, further comprising a delta signal generator (60) and a comparator (62), and
wherein a delta signal (88) from said generator (60) is applied to a first input (90) of said comparator (62), and
said input control signal is applied to a second input of said comparator.

21. The apparatus of claim 20, wherein, during operation, said delta signal (88) from said delta signal generator (60) oscillates between a non-zero minimum value (91) and a non-zero maximum value (93).

22. The apparatus of claim 20, wherein said delta signal generator (60) includes a comparator (66) having an output (68) which is connected in a negative feedback manner (74) to its negative input (76) and in a positive feedback manner (70) to its positive input (72), and wherein a storage capacitor (78) is connected to said negative input (76).

23. The apparatus of claim 18, further comprising a current sensor device (18; 128, 139, 140) for sensing a motor current, the sensed signal ($u_m$) from said current sensor device being applied to a transistor actuating at a known predetermined threshold voltage.

24. The apparatus of claim 18, further comprising a current sensor device (18; 128, 139, 140) for sensing a motor current, the sensed signal ($u_m$) from said current sensor device being applied to a comparator.

25. The apparatus of claim 10, further comprising a current sensing subcircuit for sensing motor current, and a filter (38) connected between this current sensing subcircuit and an input (30) of said PWM unit (15).

26. The apparatus of claim 25, wherein said filter (38) is formed as a T-filter.

27. The apparatus of claim 10, for an electronically commutated motor (112) with a plurality of phases (U,V,W), which phases, during operation, are supplied with current via a bridge circuit (22), and wherein
separate current sensing circuits are provided for individual branches of said bridge circuit, the output signals of these current sensing circuits being fed to an input of said PWM unit (15).

28. The apparatus of claim 27, further comprising respective filters (38, 36, 36', 36") associated with each individual current sensing circuit.

* * * * *

UNITED STATES PATENT AND TRADEMARK OFFICE
CERTIFICATE OF CORRECTION

PATENT NO : 5,933,573  
DATED : August 3, 1999  
INVENTOR(S) : Lukenich et al.

Page 1 of 2

It is certified that error appears in the above-identified patent and that said Letters Patent is hereby corrected as shown below:

On the title page, item:

[56] References Cited

FOREIGN PATENT DOCUMENTS

"42 47 036 C2" Germany should read

--27 47 036 C2--.

INID [56] References Cited

FOREIGN PATENT DOCUMENTS

"42 28 973 A1 2/1995" Germany should read

--42 28 973A1 3/1994--.

At column 1, line 65, "Fig. 3 is a set of voltage waveform graphs a, b, and c" should read --Figs. 3a-3c are graphic representations of voltage waveforms, and Fig. 3d is an associated equation--.

At column 4, line 55, "By" should be deleted.

UNITED STATES PATENT AND TRADEMARK OFFICE
CERTIFICATE OF CORRECTION

PATENT NO : 5,933,573
DATED : August 3, 1999
INVENTOR(S): Lukenich et al.

It is certified that error appears in the above-identified patent and that said Letters Patent is hereby corrected as shown below:

At column 6, line 54 "SO" should be --50--.

At column 14, line 11 after "(A-B)" "." should be --,--.

Signed and Sealed this

Twenty-ninth Day of August, 2000

Attest:

Q. TODD DICKINSON

Attesting Officer

Director of Patents and Trademarks